US010776747B2

(12) United States Patent
Deshpande et al.

(10) Patent No.: US 10,776,747 B2
(45) Date of Patent: *Sep. 15, 2020

(54) SYSTEM AND METHOD TO INCORPORATE NODE FULFILLMENT CAPACITY AND NETWORK AVERAGE CAPACITY UTILIZATION IN BALANCING FULFILLMENT LOAD ACROSS RETAIL SUPPLY NETWORKS

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Alan J. King, South Salem, NY (US); Ali Koc, White Plains, NY (US); Yingjie Li, Chappaqua, NY (US); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US); Xiaobo Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1064 days.

This patent is subject to a terminal disclaimer.

(21) Appl. No.: 15/088,686

(22) Filed: Apr. 1, 2016

(65) Prior Publication Data

US 2017/0206590 A1    Jul. 20, 2017

Related U.S. Application Data

(60) Provisional application No. 62/279,738, filed on Jan. 16, 2016.

(51) Int. Cl.
*G06Q 10/08* (2012.01)
*G06Q 30/02* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC ....... G06Q 10/08345; G06Q 10/06315; G06Q 10/0633; G06Q 10/06375; G06Q 10/083;
(Continued)

(56) References Cited

U.S. PATENT DOCUMENTS 7,050,938 B1    5/2006  Prater et al.
7,295,990 B1 *  11/2007  Braumoeller ........ G06Q 10/063
                                                    705/7.31
(Continued)

FOREIGN PATENT DOCUMENTS

WO    2005067434 A2    7/2005

OTHER PUBLICATIONS

Yin-Yann Chen. The order fulfillment planning problem considering multi-site order allocation and single-site shop floor scheduling. J Intell Manuf (2014) 25:441-458.*

(Continued)

*Primary Examiner* — Timothy Padot
(74) *Attorney, Agent, or Firm* — Scully, Scott, Murphy & Presser, PC; Joseph Petrokaitis, Esq.

(57) ABSTRACT

A method and system for evaluating node fulfillment capacity in node order assignment. The method includes receiving by a network average capacity utilization cost module an electronic record of a current order. The method includes retrieving data of a plurality of nodes, calculating an actual capacity utilization on an expected date, and determining a
(Continued)

probability of backlog on the expected date. The method includes generating a network average capacity utilization cost model, automatically converting one or more of a plurality of costs and capacity utilization into a capacity utilization cost, and transmitting the capacity utilization cost of each node to an order fulfillment engine. The method includes receiving by the engine the current order, the processing cost data, and the capacity utilization cost. The method includes automatically calculating a fulfillment cost and identifying a node with the lowest fulfillment cost for assignment.

16 Claims, 10 Drawing Sheets

(51) Int. Cl.
| | |
|---|---|
| *G06N 20/00* | (2019.01) |
| *G06F 16/14* | (2019.01) |
| *G06F 16/182* | (2019.01) |
| *G06F 16/17* | (2019.01) |
| *G06F 16/23* | (2019.01) |
| *G06N 5/00* | (2006.01) |
| *G06F 3/0482* | (2013.01) |
| *G06F 3/0484* | (2013.01) |
| *G06Q 30/06* | (2012.01) |
| *H04L 12/26* | (2006.01) |
| *G06N 5/04* | (2006.01) |
| *G06Q 10/06* | (2012.01) |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
CPC ........... G06Q 10/0833; G06Q 10/0838; G06Q 10/087; G06Q 10/0875; G06Q 30/0201; G06Q 30/0206; G06Q 30/0283; G06Q 30/0284; G06Q 30/0635; H04L 43/0882; H04L 43/16; H04L 43/0876; G06F 16/1844; G06F 16/183; G06F 16/148; G06F 16/2365; G06F 16/1734; G06F 3/0482; G06F 3/04847; G06N 5/003; G06N 5/04; G06N 5/045; G06N 20/00
USPC ...................................................... 705/7.25
See application file for complete search history.

(56) References Cited

U.S. PATENT DOCUMENTS

| | | | |
|---|---|---|---|
| 7,370,005 B1 | 5/2008 | Ham et al. | |
| 7,917,387 B2 | 3/2011 | Spurr et al. | |
| 8,015,081 B1 | 9/2011 | Franco | |
| 8,065,172 B2 | 11/2011 | Mauthe et al. | |
| 8,204,799 B1 | 6/2012 | Murray et al. | |
| 8,249,917 B1 | 8/2012 | Kassmann et al. | |
| 8,352,382 B1 | 1/2013 | Katta et al. | |
| 8,374,922 B1 * | 2/2013 | Antony ................. | G06Q 30/00 705/26.1 |
| 8,428,988 B1 | 4/2013 | Braunmoeller et al. | |
| 8,498,888 B1 * | 7/2013 | Raff ..................... | G06Q 10/087 705/22 |
| 8,577,733 B2 * | 11/2013 | Atwater ................ | G06Q 10/06 705/26.1 |
| 8,626,333 B2 | 1/2014 | Waddington et al. | |
| 8,694,389 B1 * | 4/2014 | Chowdhary ......... | G06Q 10/083 705/26.1 |
| 8,818,836 B1 * | 8/2014 | Braumoeller ........ | G06Q 10/063 705/7.25 |
| 9,213,953 B1 * | 12/2015 | Kassmann ........... | G06Q 10/0631 |
| 2002/0032573 A1 | 3/2002 | Williams et al. | |
| 2003/0050854 A1 * | 3/2003 | Showghi ............. | G06Q 20/322 705/15 |
| 2003/0069774 A1 * | 4/2003 | Hoffman ........... | G06Q 10/06375 705/7.29 |
| 2003/0093388 A1 | 5/2003 | Albright | |
| 2007/0130201 A1 | 6/2007 | Ratliff et al. | |
| 2009/0254447 A1 | 10/2009 | Blades | |
| 2012/0029974 A1 | 2/2012 | Councill et al. | |
| 2012/0150583 A1 | 6/2012 | Dueck et al. | |
| 2012/0150692 A1 | 6/2012 | Dueck et al. | |
| 2014/0047342 A1 | 2/2014 | Breternitz et al. | |
| 2014/0136255 A1 | 5/2014 | Grabovski et al. | |
| 2015/0052019 A1 | 2/2015 | Field-Darraugh et al. | |
| 2015/0127412 A1 * | 5/2015 | Kothandaraman | ........................ G06Q 30/0635 705/7.26 |
| 2017/0083967 A1 * | 3/2017 | Shiely ................ | G06Q 30/0641 |
| 2017/0091683 A1 * | 3/2017 | Tare .................. | G06Q 10/06312 |
| 2017/0323250 A1 * | 11/2017 | Lindbo .............. | G06Q 30/0621 |

OTHER PUBLICATIONS

Office Action dated Jan. 25, 2019 from related U.S. Appl. No. 15/153,963, filed May 13, 2016.
List of IBM Patents or Patent Applications Treated as Related, May 13, 2016, pp. 1-2.
Acimovic, J. A., "Lowering Outbound Shipping Costs in an Online Retail Environment by Making Better Fulfillment and Replenishment Decisions", Aug. 2012, pp. 1-198, MIT PhD thesis.
Kewill Corporation, "Omni-channel Optimization for Retailers: Fulfillment best practice to deliver on customer promises and drive down returns", Jul. 2013, pp. 1-12.
Xu, P. J., "Order Fulfillment in Online Retailing: What Goes Where", Sep. 2005, pp. 1-146, MIT Thesis.
Mell, P., et al., "The NIST Definition of Cloud Computing", NIST Special Publication 800-145, National Institute of Standards and Technology, U.S. Department of Commerce, Sep. 2011, pp. 1-7.
Office Action dated Apr. 17, 2019 from related U.S. Appl. No. 15/154,119, filed May 13, 2016.
Office Action dated Jul. 27, 2018 from related U.S. Appl. No. 15/153,963.
Office Action dated Apr. 21, 2020 from related U.S. Appl. No. 15/153,963, filed May 13, 2016.
1 IBM Corporation, "IBM Sterling Order Management", Aug. 15, 2014, pp. 1-5.
Notice of Allowance dated May 19, 2020 from related U.S. Appl. No. 15/153,921, filed May 13, 2016.
Chen-Fu Chien et al., "Modeling order assignment for semiconductor assembly hierarchical outsourcing and developing the decision support system", Flex Serv Manuf J (2010) 22:109-139.

* cited by examiner

SYSTEM AND METHOD TO INCORPORATE NODE FULFILLMENT CAPACITY AND NETWORK AVERAGE CAPACITY UTILIZATION IN BALANCING FULFILLMENT LOAD ACROSS RETAIL SUPPLY NETWORKS

CROSS REFERENCE TO RELATED PATENTS AND APPLICATIONS

This application claims priority from U.S. Provisional Application No. 62/279,738 filed on Jan. 16, 2016.

BACKGROUND

This disclosure is directed to computer generated node order fulfillment performance and more particularly, to computer generated node order fulfillment performance considering capacity utilization cost.

Omni-channel retailers employ a number of channels to fulfill online orders. One approach to find optimal fulfillment solutions is to model the fulfillment problem as a multi-objective optimization problem, where the solution is order item assignments across a large number of fulfillment candidate nodes (stores, ecommerce fulfillment centers, etc.).

A key issue when assigning a part of an order to a node for fulfillment is that the order can get backlogged due to limited node capacity, that is, the laborers who can pick the items at the node and fulfill the order. Node capacity is especially a problem when non-traditional fulfillment nodes are considered in the node fulfillment decision such as stores in the recent ship-from-store trend. On the other hand, nodes can remain underutilized—having more capacity available than is being used. Therefore, factoring in the node fulfillment capacity and capacity utilization of a node would be useful for balancing fulfillment load across retail supply networks and avoiding costly delays due to overloading the current resources of the node.

SUMMARY OF THE INVENTION

One embodiment is directed to a method for evaluating node fulfillment capacity in node order assignment. The method includes receiving by a computer processor of a network average capacity utilization cost module an electronic record of a current order from a customer. The computer processor of the network average capacity utilization cost module has program instructions. The method then includes retrieving data of each node from a plurality of nodes. The retrieved data of each node includes current capacity utilization, capacity of a current day, backlog and network average capacity utilization. The method also includes calculating an actual capacity utilization on an expected date of each node of the plurality of nodes. The actual capacity utilization is based on the retrieved current capacity utilization, the capacity of a current day, and the backlog. Further, the method includes determining a probability of backlog on the expected date of each node of the plurality of nodes. The probability of backlog is based on the actual capacity utilization. Then, the method includes generating a network average capacity utilization cost model defining a lower capacity utilization threshold of each node of the plurality of nodes and an upper capacity utilization threshold of each node of the plurality of nodes. Next, the method includes automatically converting one or more of processing cost of the current order and backlog cost, labor cost, the network average capacity utilization, and the actual capacity utilization of each node of the plurality of nodes into a capacity utilization cost of the each node using the generated network average capacity utilization cost model. The method next includes transmitting the capacity utilization cost of each node to an order fulfillment engine.

Further, the method includes receiving by a computer processor of the order fulfillment engine the electronic record of the current order for node order assignment. Thereafter, the method includes retrieving by the computer processor of the order fulfillment engine the processing cost data of each node from a plurality of nodes. Next, the method includes receiving by the computer processor of the order fulfillment engine the converted capacity utilization cost of each node from a plurality of nodes. Afterwards, the method includes automatically calculating a fulfillment cost of each node of the plurality of nodes of the current order based on the processing cost data of each node from the plurality of nodes and the capacity utilization cost of each node from a plurality of nodes. The method then includes identifying one or more nodes from the plurality of nodes of the current order with the lowest fulfillment cost based on the calculated fulfillment cost. Finally, the method includes automatically generating a node order assignment assigning the current order to one of the one or more nodes with the lowest fulfillment cost.

In one embodiment, when the actual capacity utilization is lower than the lower capacity utilization threshold, the capacity utilization cost is the negative of the processing cost.

In another embodiment, when the actual capacity utilization is higher than the upper capacity utilization threshold, the capacity utilization cost is calculated by adding the backlog cost and deducting the processing cost.

In one embodiment, when the actual capacity utilization is lower than the lower capacity utilization threshold, the capacity utilization cost is the negative of a regular labor cost or the negative of an idling labor cost, which is essentially a reward.

In another embodiment, when the actual capacity utilization is higher than the upper capacity utilization threshold, the capacity utilization cost is the overtime labor cost, which is higher than the regular labor cost.

In one embodiment, when the calculated actual capacity utilization equals or is in between the lower capacity utilization threshold and the upper capacity utilization threshold, the capacity utilization cost is based on the network average capacity utilization, the actual capacity utilization, and the labor cost. The labor cost can be a tie-breaker/flat cost added to each node in order to give preference to nodes with cheaper labor cost, when all else are equal.

In another embodiment, the capacity utilization cost is calculated as: Capacity Utilization Cost=[(CU−Avg_CU)/Avg_CU]×Labor_Cost. CU is the actual capacity utilization, Avg_CU is the average capacity utilization, and Labor_Cost is the labor cost.

One embodiment is directed to a network average capacity utilization cost module for evaluating node fulfillment capacity in node order assignment. The module includes one or more non-transitory computer readable storage media and program instructions, stored on the one or more non-transitory computer-readable storage media, which when implemented by a user interface accessing a service provider website, cause the computer system to perform the step of receiving by a computer processor of a network average capacity utilization cost module an electronic record of a current order from a customer. The method then includes retrieving data of each node from a plurality of nodes. The retrieved data of each node includes current capacity utilization, capacity of a current day, backlog and network average capacity utilization. The method also includes calculating an actual capacity utilization on an expected date of each node of the plurality of nodes. The actual capacity utilization is based on the retrieved current capacity utilization, the capacity of a current day, and the backlog. Further, the method includes determining a probability of backlog on the expected date of each node of the plurality of nodes. The probability of backlog is based on the actual capacity utilization. Then, the method includes generating a network average capacity utilization cost model defining a lower capacity utilization threshold of each node of the plurality of nodes and an upper capacity utilization threshold of each node of the plurality of nodes. Next, the method includes automatically converting one or more of processing cost of the current order and backlog cost, labor cost, the network average capacity utilization, and the actual capacity utilization of each node of the plurality of nodes into a capacity utilization cost of the each node using the generated network average capacity utilization cost model.

The method next includes transmitting the capacity utilization cost of each node to an order fulfillment engine. The order fulfillment engine includes one or more non-transitory computer readable storage media and program instructions, stored on the one or more non-transitory computer-readable storage media, which when implemented by a user interface accessing a service provider website, cause the computer system to perform the step of receiving the electronic record of the current order for node order assignment. The method then includes retrieving the processing cost data of each node from a plurality of nodes. Next, the method includes receiving the converted capacity utilization cost of each node from a plurality of nodes. Afterwards, the method includes automatically calculating a fulfillment cost of each node of the plurality of nodes of the current order based on the processing cost data of each node from the plurality of nodes and the capacity utilization cost of each node from a plurality of nodes. The method then includes identifying one or more nodes from the plurality of nodes of the current order with the lowest fulfillment cost based on the calculated fulfillment cost. Finally, the method includes automatically generating a node order assignment assigning the current order to one of the one or more nodes with the lowest fulfillment cost.

One embodiment is directed to a non-transitory article of manufacture tangibly embodying computer readable instructions, which when implemented by a user interface accessing a service provider website, cause the computer system to perform the step of receiving by a computer processor of a network average capacity utilization cost module an electronic record of a current order from a customer. The method then includes retrieving data of each node from a plurality of nodes. The retrieved data of each node includes current capacity utilization, capacity of a current day, backlog and network average capacity utilization. The method also includes calculating an actual capacity utilization on an expected date of each node of the plurality of nodes. The actual capacity utilization is based on the retrieved current capacity utilization, the capacity of a current day, and the backlog. Further, the method includes determining a probability of backlog on the expected date of each node of the plurality of nodes. The probability of backlog is based on the actual capacity utilization. Then, the method includes generating a network average capacity utilization cost model defining a lower capacity utilization threshold of each node of the plurality of nodes and an upper capacity utilization threshold of each node of the plurality of nodes. Next, the method includes automatically converting one or more of processing cost of the current order and backlog cost, labor cost, the network average capacity utilization, and the actual capacity utilization of each node of the plurality of nodes into a capacity utilization cost of the each node using the generated network average capacity utilization cost model. The method next includes transmitting the capacity utilization cost of each node to an order fulfillment engine. Further, the method includes receiving by a computer processor of the order fulfillment engine the electronic record of the current order for node order assignment. Thereafter, the method includes retrieving by the computer processor of the order fulfillment engine the processing cost data of each node from a plurality of nodes. Next, the method includes receiving by the computer processor of the order fulfillment engine the converted capacity utilization cost of each node from a plurality of nodes. Afterwards, the method includes automatically calculating a fulfillment cost of each node of the plurality of nodes of the current order based on the processing cost data of each node from the plurality of nodes and the capacity utilization cost of each node from a plurality of nodes. The method then includes identifying one or more nodes from the plurality of nodes of the current order with the lowest fulfillment cost based on the calculated fulfillment cost. Finally, the method includes automatically generating a node order assignment assigning the current order to one of the one or more nodes with the lowest fulfillment cost.

BRIEF DESCRIPTION OF THE DRAWINGS

These are other objects, features and advantages of the present invention will become apparent from the following detailed description, which is to be read in connection with the accompanying drawing, in which.

DETAILED DESCRIPTION

This invention is a system and method for evaluating node fulfillment capacity in node order assignment. In one embodiment, the invention incorporates network average capacity utilization and processing cost (fulfillment cost without capacity utilization cost) into a calculation of the capacity utilization cost for calculating a final fulfillment cost (fulfillment cost with capacity utilization cost) in a fulfillment engine. In another embodiment, the invention incorporates labor cost into of capacity utilization cost for calculating a final fulfillment cost in a fulfillment engine. The fulfillment engine can be a multi-objective optimization-based engine to factor in when balancing a number of objectives for node order assignment. The invention generates a model defining a lower capacity utilization threshold based on the network average capacity utilization and an upper capacity utilization threshold based on the probability of backlog (fulfillment capacity). The model derives a mathematical approach converting network average capacity utilization, processing cost and/or labor cost into a calculable capacity utilization cost.

Node fulfillment capacity, capacity utilization, and capacity utilization cost are modeled in such a way that in general, the node with the least capacity utilization will be preferred. Capacity utilization for a node is the number of units assigned to the node so far divided by its processing capacity—the total number of units it is expected to be able to process in the day. This means that if an equal number of units have been assigned to two different nodes, the node with higher capacity is preferred for assigning subsequent items/orders. The weight applied to the calculated fulfillment capacity utilization cost can be adjusted to trade-off between improving capacity utilization with other business objectives.

By factoring in node fulfillment capacity, network average capacity utilization, processing cost and/or labor rate in the fulfillment decision, the retailers are able to balance the workload between fulfillment nodes with their actual, real-time capacity; reduce labor cost from extra workers hired for order fulfillment at a node beyond its capacity as well as cost due to having to upgrade orders when workers cannot process all units in the same day; and better utilize labors that are allocated already.

Figure 1A:
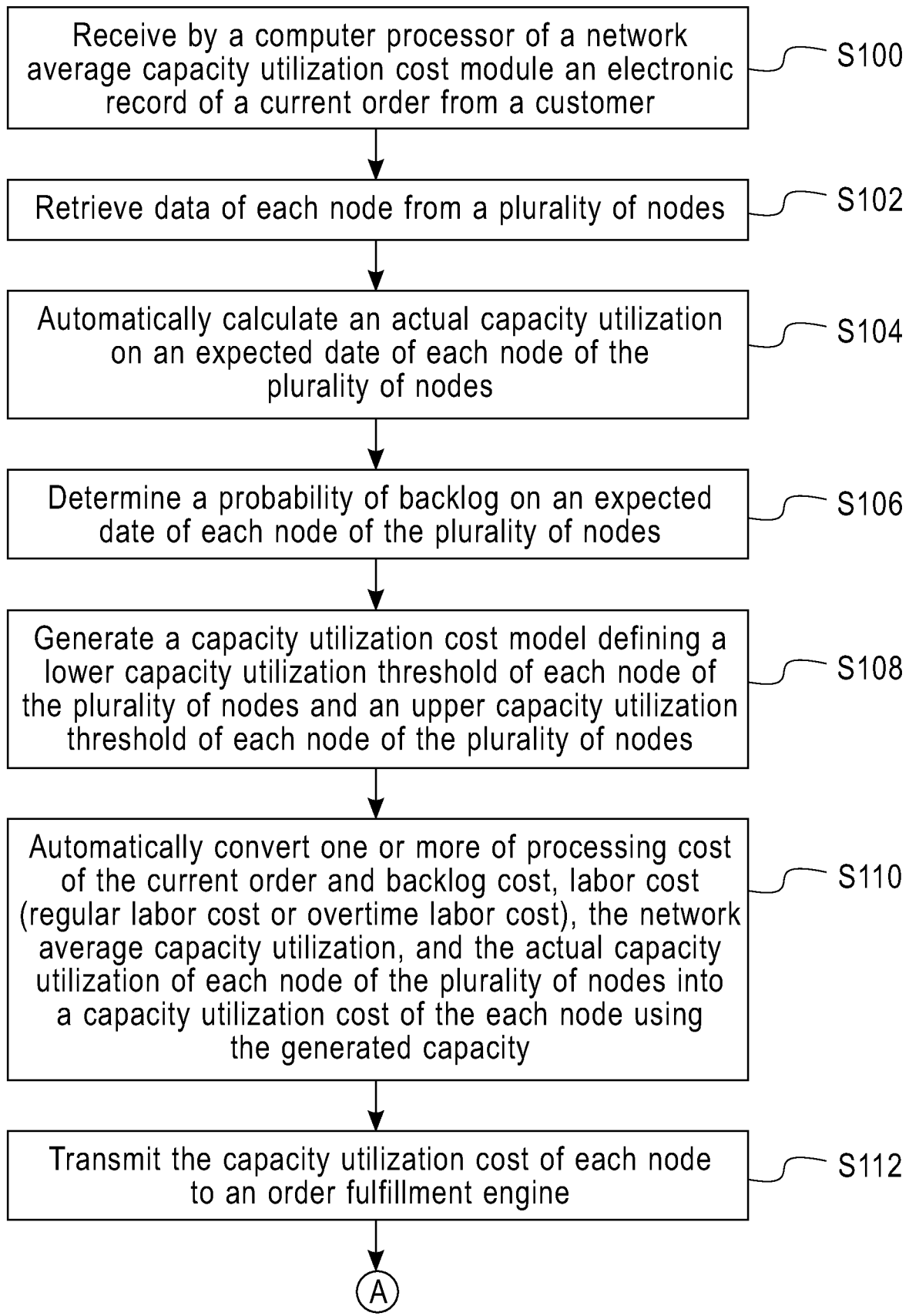
FIG. 1 A and FIG. 1 B are flow charts of the steps of one embodiment of the method of the invention.
Figure 1B:
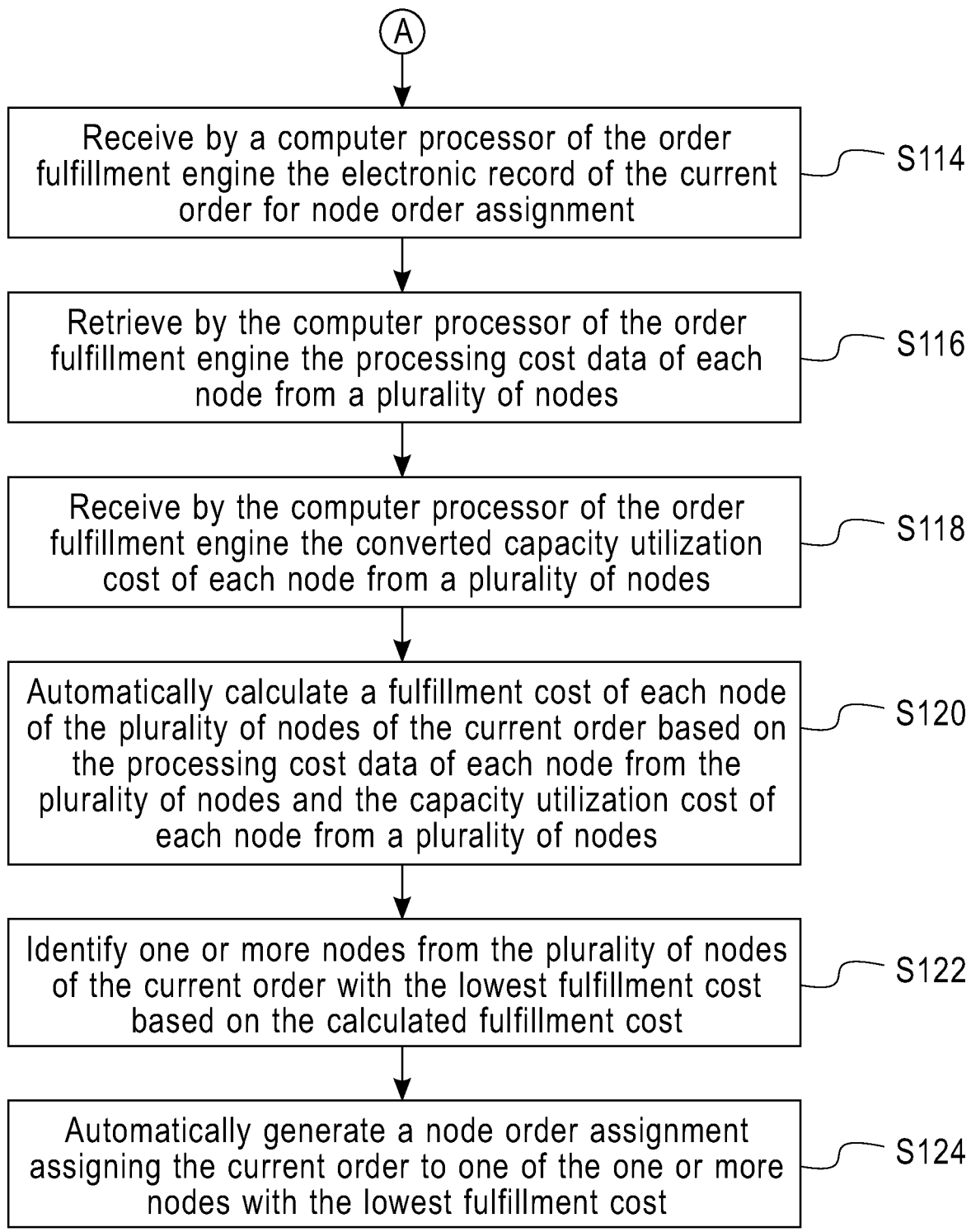

As is shown in FIG. 1 A, one embodiment of the method of the invention begins with step S100 of receiving by a computer processor of a network average capacity utilization cost module an electronic record of a current order from a customer. The computer processor of the network average capacity utilization cost module has program instructions. At step S102, the program instructions executed by the processor of the network average capacity utilization cost module allows the module to retrieve data of each node from a plurality of nodes. The retrieved data of each node includes current capacity utilization, capacity of a current day, backlog and network average capacity utilization. Capacity of a current day is a planned capacity in units of the current day. Current capacity utilization is the percentage of total daily capacity used so far in a current day and is calculated from the number of units assigned for processing so far in a current day divided by the capacity of that current day. Current capacity utilization is updated regularly—for example, based on a predetermined time interval or real time. Continuous order assignment to a node increases capacity utilization of that node. Backlog is the backlog units at the beginning of the current day. Network average capacity utilization is the average capacity utilization of a plurality of nodes chosen from a network of nodes.

Then, at step S104, the module automatically calculates an actual capacity utilization on an expected date of each node of the plurality of nodes. The actual capacity utilization is based on the retrieved current capacity utilization, the capacity of a current day, and the backlog. The actual capacity utilization differs from the current capacity utilization by taking backlog into consideration.

Further at step S106, the module determines a probability of backlog on the expected date of each node of the plurality of nodes. The probability of backlog is based on the actual capacity utilization. The expected ship date of a node is the date on which the current order is expected to be shipped from that node. The probability of backlog on the expected ship date is the probability that the current order will be backlogged on that expected ship date due to lack of capacity given the actual capacity utilization level.

At step S108, the module generates a network average capacity utilization cost model defining a lower capacity utilization threshold of each node of the plurality of nodes and an upper capacity utilization threshold of each node of the plurality of nodes. The lower capacity utilization threshold is based on the network average capacity utilization. The lower capacity utilization threshold is a predetermined tolerable capacity utilization variance below the network average capacity utilization. The upper capacity utilization threshold is based on the determined probability of backlog, which can be set at a specified, configurable point where backlog risk becomes high. The lower capacity utilization threshold and the upper capacity utilization threshold can be set constant for all nodes of a retailer, varied for each node, or customized to frequently change to satisfy the need of retailers.

Then, at step S110, the module automatically converts one or more of processing cost of the current order and backlog cost, labor cost, the network average capacity utilization, and the actual capacity utilization of each node of the plurality of nodes into a capacity utilization cost of the each node using the generated network average capacity utilization cost model. Processing cost of the current order is the fulfillment cost of the order, optionally including shipping cost. Backlog cost is the average cost per unit associated with expediting backlog days in backlogged orders. Backlog days at a node are the days an order gets delayed at a node due to the limited node capacity of that node. Backlog cost can increase for each backlog day of an order waiting to be shipped and can also take into account the shipping cost of an order. Labor cost is the cost of labor per unit pick up. Further at step S112, the module transmits the capacity utilization cost of each node to an order fulfillment engine.

As is shown in FIG. 1 B, at step S114, a computer processor of the order fulfillment engine receives the electronic record of the current order for node order assignment. Then at step S116, the engine retrieves the processing cost data of each node from a plurality of nodes. Further at step S118, the engine receives the converted capacity utilization cost of each node from a plurality of nodes.

At step S120, the engine automatically calculates a fulfillment cost of each node of the plurality of nodes of the current order based on the processing cost data of each node from the plurality of nodes and the capacity utilization cost of each node from a plurality of nodes. Then at step S122, the engine identifies one or more nodes from the plurality of nodes of the current order with the lowest fulfillment cost based on the calculated fulfillment cost. Finally, at step S124, the engine automatically generates a node order assignment assigning the current order to one of the one or more nodes with the lowest fulfillment cost.

Figure 2:
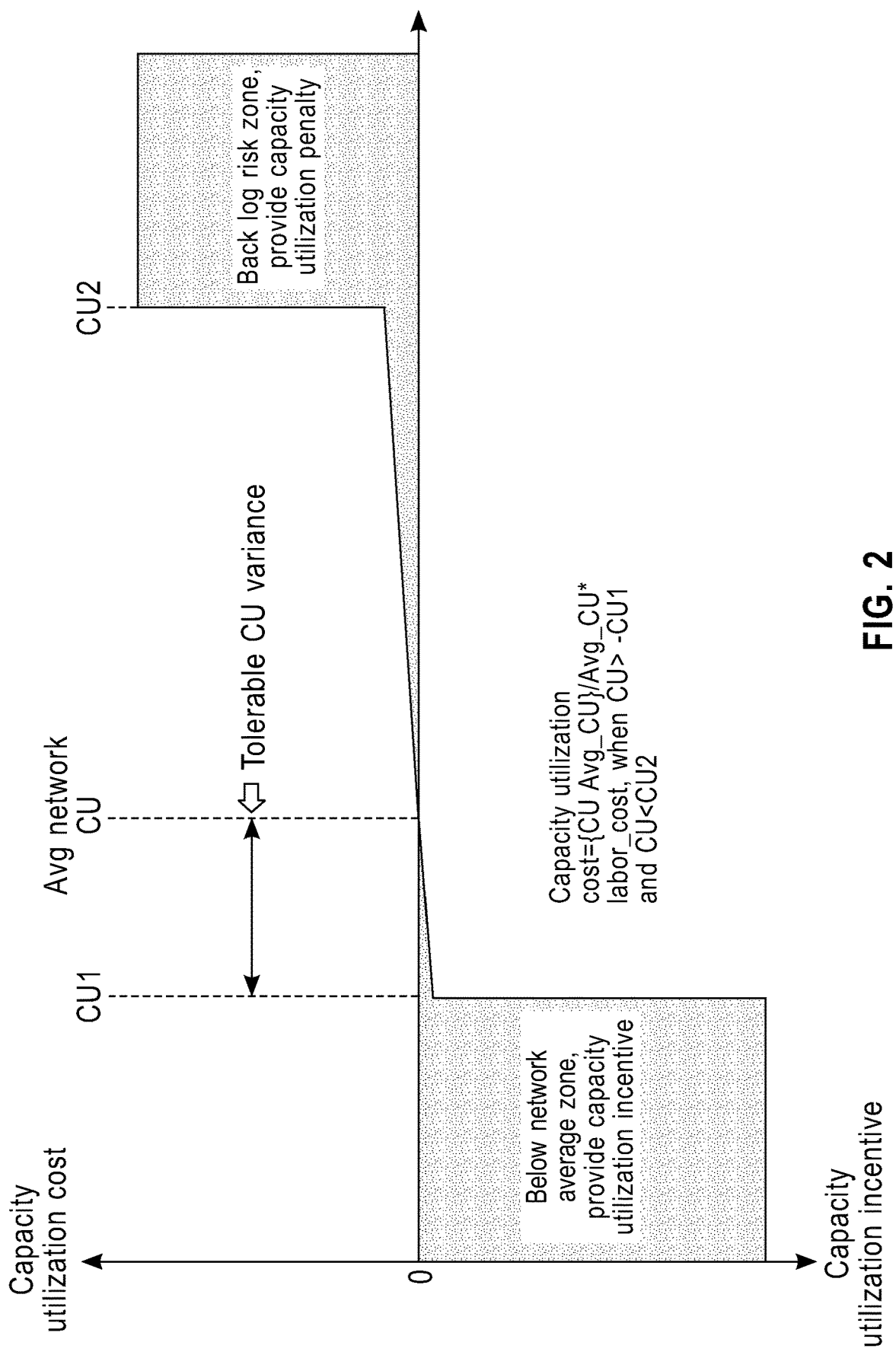
FIG. 2 is a graph of different embodiments of determining a capacity utilization cost in different sections of the network average capacity utilization cost model.

FIG. 2 depicts different embodiments of determining a capacity utilization cost in different sections of the network average capacity utilization cost model. In one embodiment, when the actual capacity utilization is lower than the lower capacity utilization threshold, the capacity utilization cost is the negative of the processing cost. Equalizing the capacity utilization cost of a node with the negative of the processing cost of that node rewards the node with a negative capacity utilization cost (capacity utilization incentive), therefore leading to a higher possibility of low fulfillment cost and the incentive of assigning the order to that node. In another embodiment, when the actual capacity utilization is higher than the upper capacity utilization threshold, the capacity utilization cost is calculated by adding the backlog cost and deducting the processing cost. Adding the backlog cost in the calculation of the capacity utilization cost penalizes the node with higher capacity utilization cost, therefore leading to a lower possibility of low fulfillment cost and the disincentive of assigning the order to that node.

Figure 3:
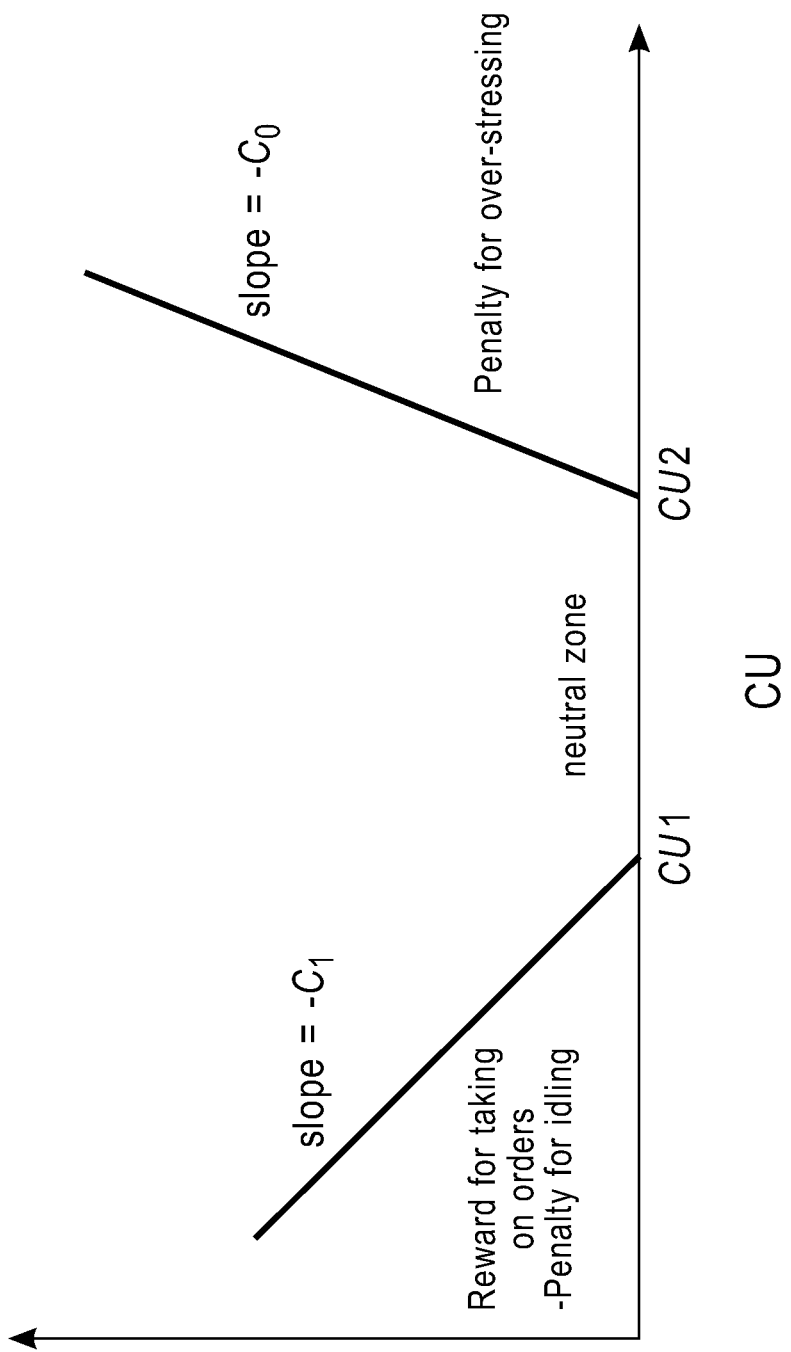
FIG. 3 is a graph of different embodiments of determining a capacity utilization cost based on labor cost in different sections of the network average capacity utilization cost model.

FIG. 3 depicts different embodiments of determining a capacity utilization cost based on labor cost in different sections of the network average capacity utilization cost model. The labor cost can be a regular labor cost, or overtime labor cost. In one embodiment, when the actual capacity utilization is lower than the lower capacity utilization threshold as shown on the left side of slope=$-C_1$, the capacity utilization cost is the negative of a regular labor cost or the negative of an idling labor cost $C_1$, which is essentially a reward and encourages all nodes to have capacity utilization closer to the network average/neutral zone. When considering two nodes to assign to, a node that is farther below the network average will be preferred due to a higher reward (lower capacity utilization cost). The node will be chosen to assign items of an order over other nodes, causing increases in its capacity utilization cost, bringing its capacity utilization closer to the network average and reducing the deviation of that node's capacity utilization from the network average. Further, by having an increasing cost above an upper capacity utilization threshold, as described below, which prefers avoiding over-utilized nodes, the module prevents those over-utilized nodes from getting farther from the network average utilization. Additionally, the labor cost can be a tie-breaker/flat cost added to each node in order to give preference to nodes with cheaper labor cost, when all else are equal. Adding to the capacity utilization cost of a node with the regular labor cost of that node rewards the node with a low capacity utilization cost, therefore leading to a higher possibility of low fulfillment cost and the incentive of assigning the order to that node. This can be beneficial in the long run for a retailer, as if they are able to assign more items to lower cost nodes, then can reduce labor staffing at more costly nodes, further decreasing costs at the low-cost nodes over time. In another embodiment, when the actual capacity utilization is higher than the upper capacity utilization threshold as shown on the right side of slope=$C_0$, the capacity utilization cost is the overtime labor cost $C_0$, which is higher than the regular labor cost. Equalizing the capacity utilization cost of a node with the overtime labor cost of that node penalizes the node with a high capacity utilization cost, therefore leading to a lower possibility of low fulfillment cost and the disincentive of assigning the order to that node.

In one embodiment, when the calculated actual capacity utilization equals or is in between the lower capacity utilization threshold and the upper capacity utilization threshold, the capacity utilization cost is based on the network average capacity utilization, the actual capacity utilization, and the labor cost.

In another embodiment, the capacity utilization cost is calculated as: Capacity Utilization Cost=[ (CU−Avg_CU)/Avg_CU]×Labor_Cost. CU is the actual capacity utilization, Avg_CU is the average capacity utilization, and Labor_Cost is the labor cost.

Figure 4:
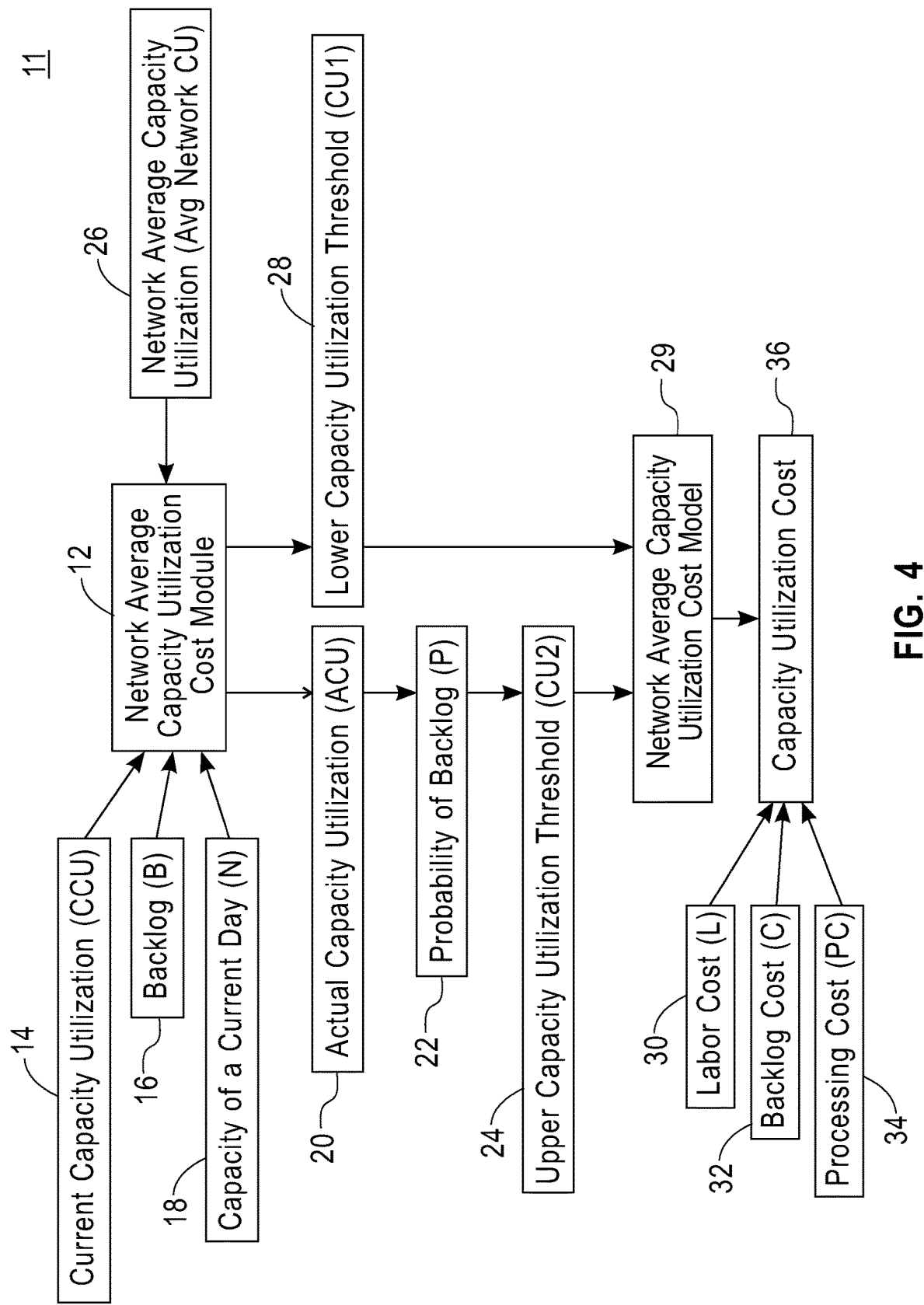
FIG. 4 is a block diagram of one embodiment of the system of the invention.

FIG. 4 depicts one embodiment of a capacity utilization cost system 11. The network average capacity utilization cost module 12 takes current capacity utilization 14, backlog 16, capacity of a current day 18 to calculate the actual capacity utilization 20. The module then determines the probability of backlog 22 from the actual capacity utilization 20. The module further uses the probability of backlog 22 to set the upper capacity utilization threshold 24 defined in the network average capacity utilization cost model 29. The network average capacity utilization cost module 12 also takes network average capacity utilization 26 to determine the lower capacity utilization threshold 28 defined in the network average capacity utilization cost model 29. In one embodiment, the network average capacity utilization cost model 29 then takes into account of labor cost 30, backlog cost 32, processing cost 34, actual capacity utilization 20 and network average capacity utilization 26 for automatically converting them into a capacity utilization cost 36. In another embodiment, the network average capacity utilization cost model 29 then takes into account of labor cost 30 (regular labor cost or overtime labor cost) for automatically converting them into a capacity utilization cost 36.

Figure 5:
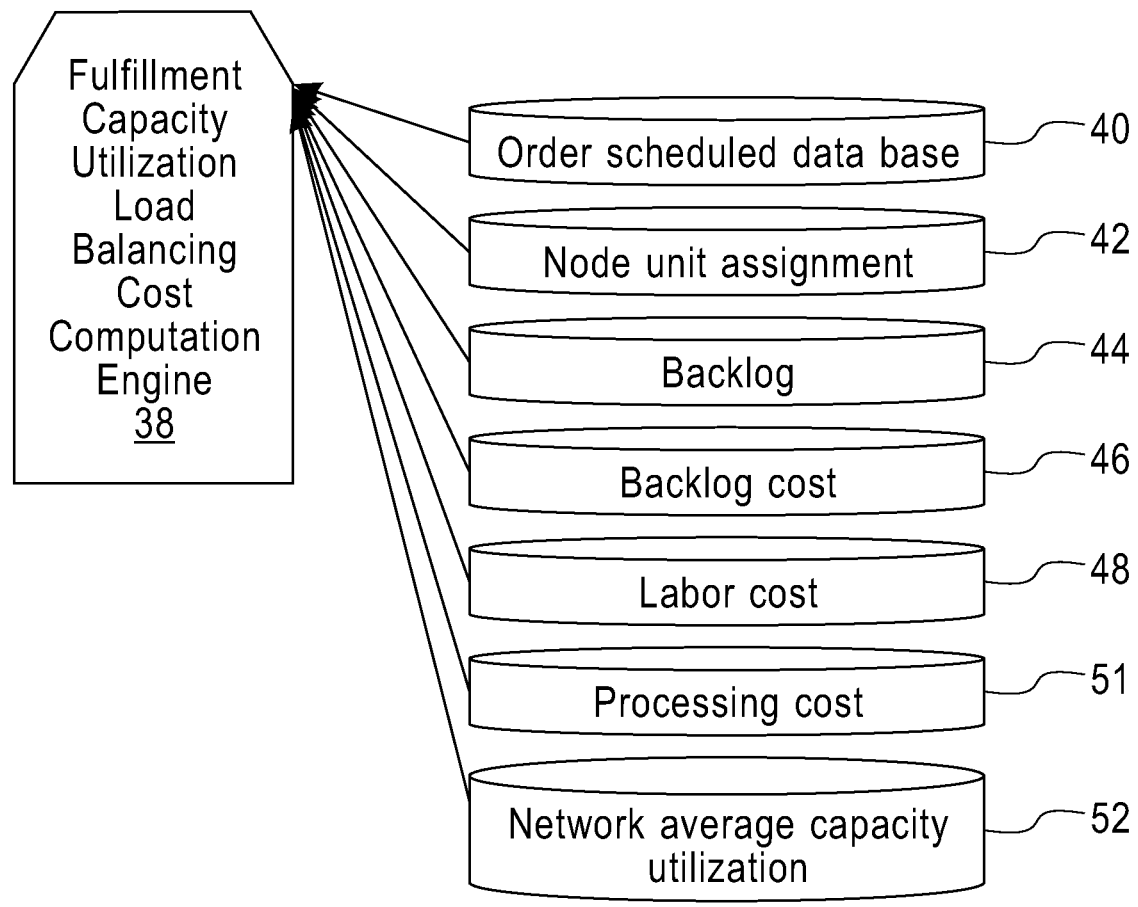
FIG. 5 is a block diagram of one embodiment of the cost computation engine.

As is shown in FIG. 5, the diagram depicts one embodiment of the fulfillment capacity utilization load balancing cost computation engine 38. The fulfillment capacity utilization load balancing cost computation engine 38 considers the capacity of a current day from a planned daily capacity database 40, the number of units assigned from a node unit assignment database 42, backlog from a backlog database 44, backlog cost from a backlog cost database 46, labor cost (regular labor cost or overtime labor cost) from a labor cost database 48, processing cost (optionally including shipping cost) from a processing cost database 51 and network average capacity utilization from a network average capacity utilization database 52 for converting the data considered into a capacity utilization cost.

Figure 6:
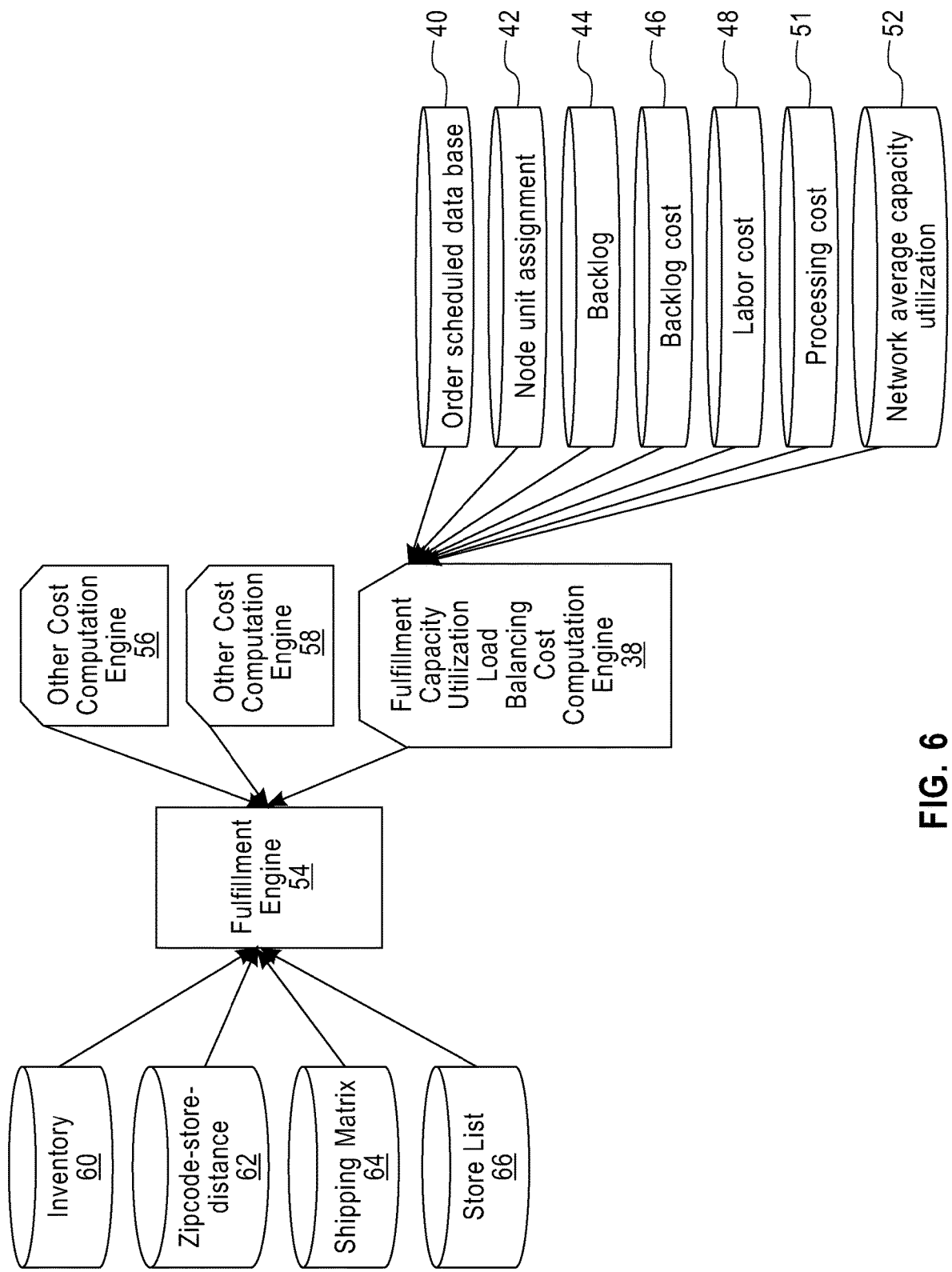
FIG. 6 is a block diagram of one embodiment of the integration between the cost computation engine with a fulfillment engine and other cost computation engines.

As is shown in FIG. 6, the diagram depicts one embodiment of the integration between the fulfillment capacity utilization load balancing cost computation engine 38 with a fulfillment engine 54, other cost computation engine 56 and other cost computation engine 58. One example of the other cost computation engine 56 is a cancelation cost computation engine, which takes a variety of data into consideration. The data includes order scheduled, order release status and labor cost. One example of the other cost computation engine 58 is a loyalty reward module, which takes a variety of data into consideration. The data includes customer loyalty reward data and carrier and shipping method specific $CO_2$/miles data. The data considered by other cost computation engine 56 and other cost computation engine 58 can be overlapping. The fulfillment engine 54 minimizes a fulfillment cost of an order applying customer business objective weighting to costs calculated from the fulfillment capacity utilization load balancing cost computation engine 38, other cost computation engine 56, other cost computation engine 58, and shipping matrix 64. The fulfillment engine 54 obtains inventory data 60, zipcode-store-distance data 62 and store lists 66 for calculating a fulfillment cost and identifying one or more nodes for order fulfillment performance. The system can be implemented as a cloud system or an on-premise system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 7:
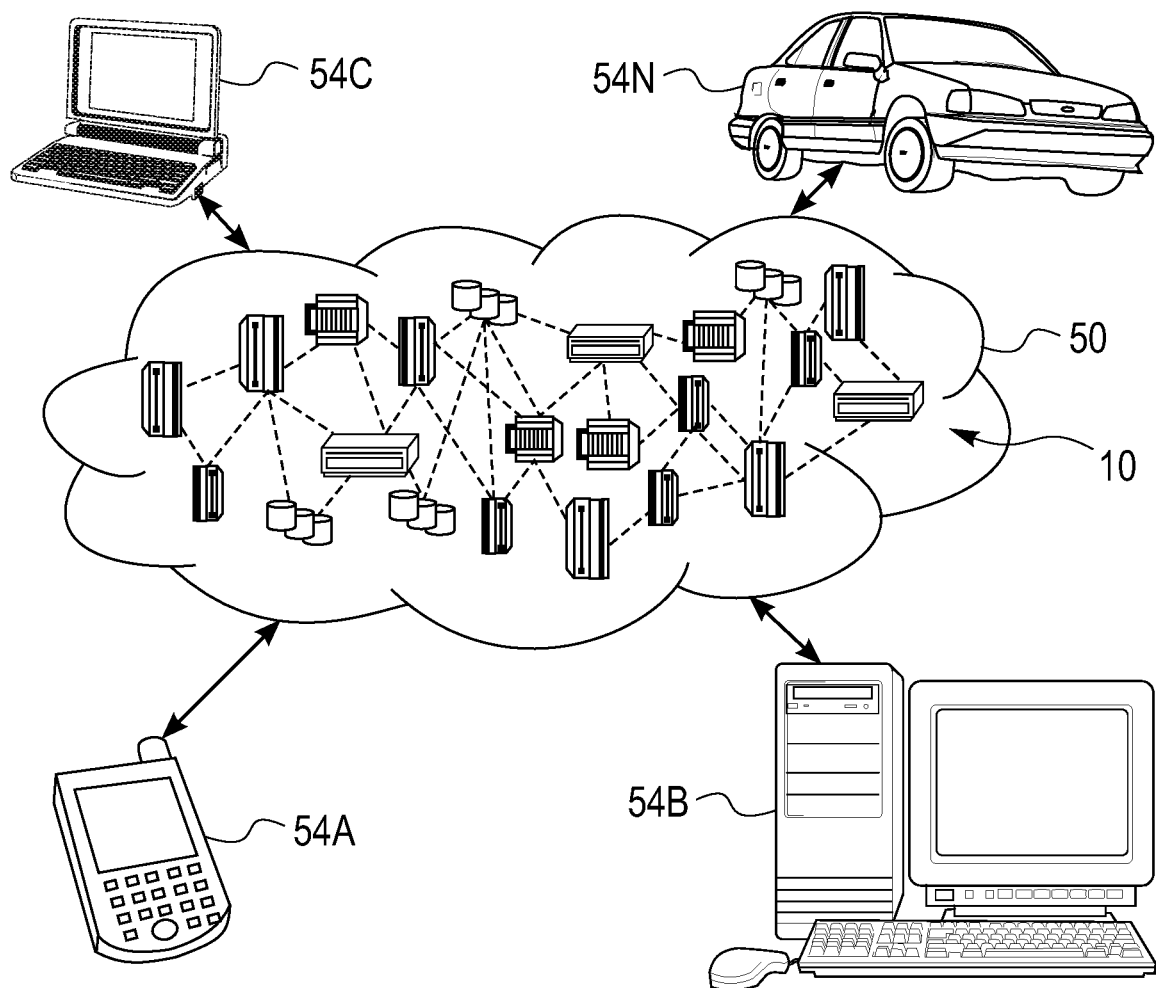
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
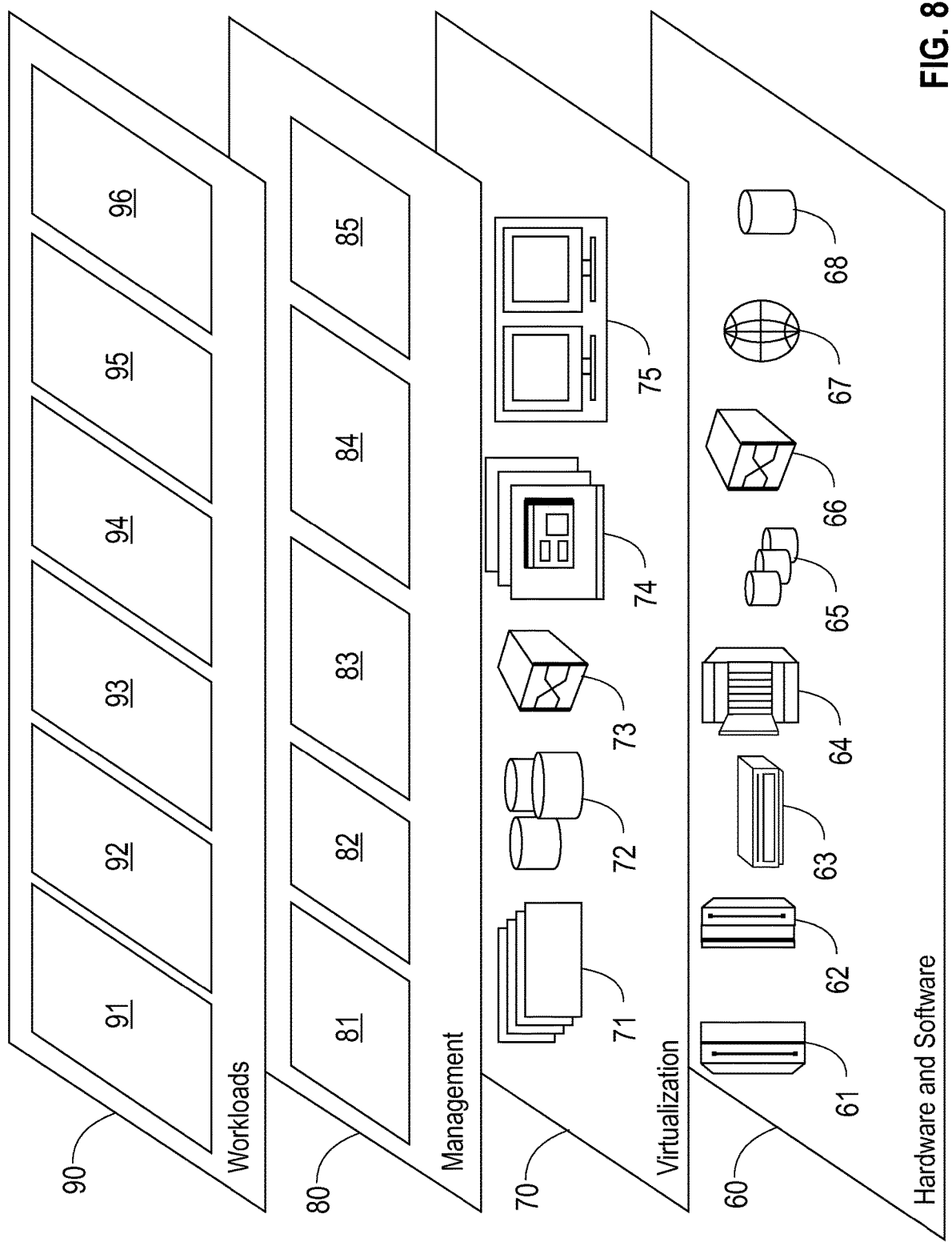
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment optimization 96.

Figure 9:
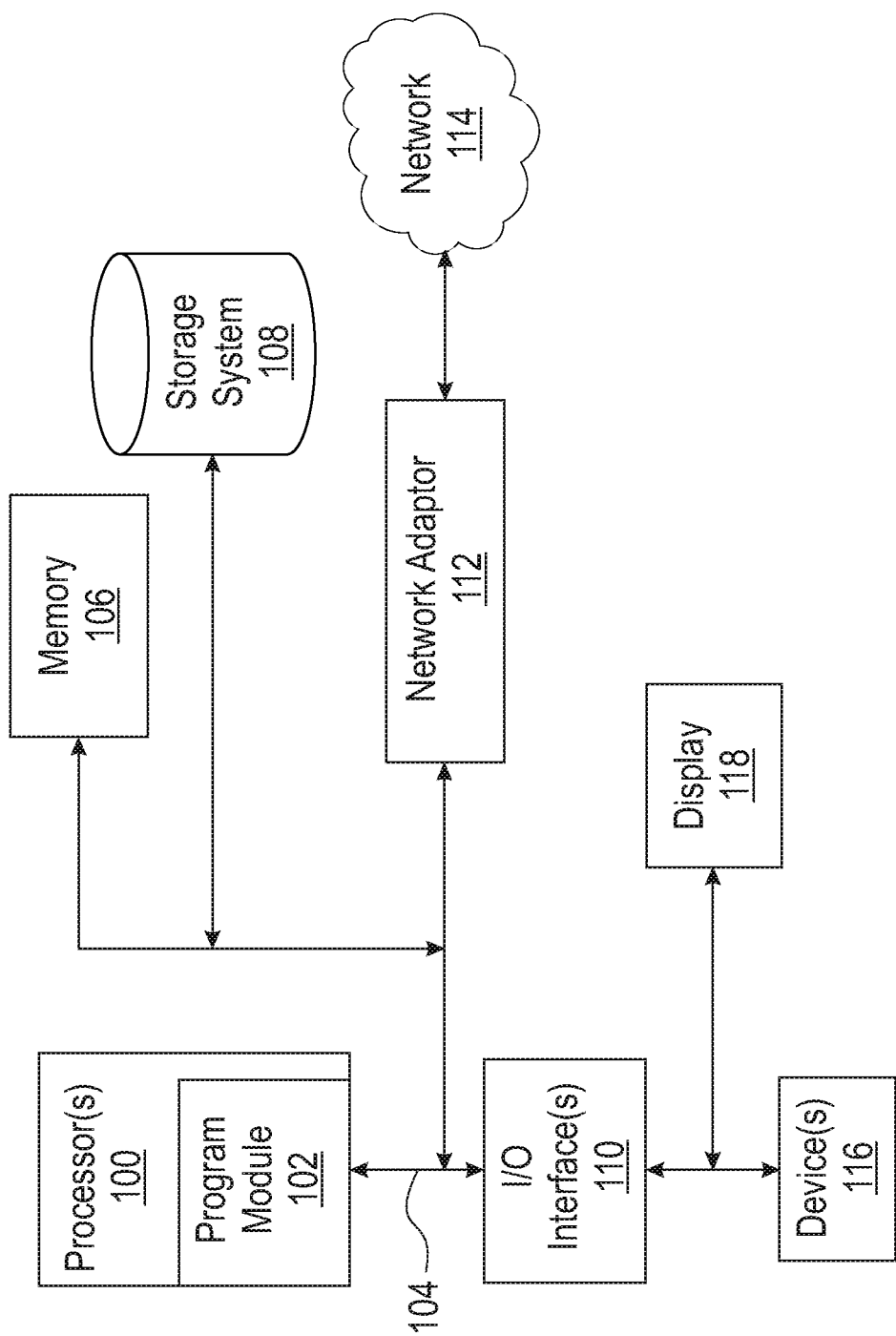
FIG. 9 is a block diagram of an exemplary computing system suitable for implementation of this invention.

FIG. 9 illustrates a schematic of an example computer or processing system that may implement the method for evaluating node fulfillment capacity in node order assignment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for incorporating network average capacity utilization in node order assignment, comprising:
   receiving by a computer processor of a network average capacity utilization cost module an electronic record of a current order from a customer, the computer processor of the network average capacity utilization cost module having program instructions, which when executed by the processor of the network average capacity utilization cost module, performs the steps of:
   retrieving data of each node from a plurality of nodes, the retrieved data of each node comprising capacity of a current day, backlog and network average capacity utilization;
   determining current capacity utilization for each node, the current capacity utilization being the percentage of total daily capacity used so far in a current day;
   continuously updating the current capacity utilization;
   automatically calculating an actual capacity utilization on an expected date of each node of the plurality of nodes, the actual capacity utilization being based on the retrieved updated current capacity utilization, the capacity of a current day, and the backlog;
   determining a probability of backlog on the expected date of each node of the plurality of nodes, the probability of backlog being based on a lack of capacity given the actual capacity utilization;
   generating a network average capacity utilization cost model defining a lower capacity utilization threshold of each node of the plurality of nodes and an upper capacity utilization threshold of each node of the plurality of nodes, the lower capacity utilization threshold being a predetermined capacity utilization variance below the network average capacity utilization, and the upper capacity utilization threshold being based on the determined probability of backlog;
   automatically converting a processing cost of the current order, a backlog cost, a labor cost, the network average capacity utilization, and the actual capacity utilization of each node of the plurality of nodes into a capacity utilization cost of the each node using the generated network average capacity utilization cost model; and
   transmitting the capacity utilization cost of each node to an order fulfillment engine, the order fulfillment engine being a multi-objective optimization-based engine of an order management system;
   receiving by a computer processor of the order fulfillment engine the electronic record of the current order for node order assignment;
   retrieving by the computer processor of the order fulfillment engine the processing cost data of each node from a plurality of nodes,
   receiving by the computer processor of the order fulfillment engine the capacity utilization cost of each node from a plurality of nodes the computer processor of the order fulfillment engine having program instructions, which when executed by the processor of the order fulfillment engine, performs the steps of:
   automatically calculating a fulfillment cost of each node of the plurality of nodes of the current order based on the processing cost data of each node from the plurality of nodes and the capacity utilization cost of each node from a plurality of nodes;
   identifying one or more nodes from the plurality of nodes of the current order with the lowest fulfillment cost based on the calculated fulfillment cost; and
   automatically generating a node order assignment assigning the current order to one of the one or more nodes with the lowest fulfillment cost thereby balancing the node fulfillment between the plurality of nodes based on actual capacity.

2. The method of claim 1, wherein the capacity utilization cost is the negative of the processing cost, when the calculated actual capacity utilization is lower than the lower capacity utilization threshold.

3. The method of claim 1, wherein the capacity utilization cost is calculated by adding the backlog cost and deducting the processing cost, when the calculated actual capacity utilization is higher than the upper capacity utilization threshold.

4. The method of claim 1, wherein the capacity utilization cost is based on the network average capacity utilization, the actual capacity utilization, and the labor cost, when the calculated actual capacity utilization equals or is in between the lower capacity utilization threshold and the upper capacity utilization threshold.

5. The method of claim 4, wherein converting the capacity utilization cost includes:
   Capacity Utilization Cost=$[(CU-Avg\_CU)/Avg\_CU] \times Labor\_Cost$, wherein CU is the actual capacity utilization, Avg_CU is the average capacity utilization, and Labor_Cost is the labor cost.

6. A computer system for determining node order fulfillment performance, comprising:
   a processor; and
   a memory having program instructions, which when executed by the processor cause a network average capacity utilization cost module to perform the steps of:
   receiving an electronic record of a current order from a customer;
   retrieving data of each node from a plurality of nodes, the retrieved data of each node comprising, capacity of a current day, backlog and network average capacity utilization;
   determining current capacity utilization for each node, the current capacity utilization being the percentage of total daily capacity used so far in a current day;
   continuously updating the current capacity utilization;
   automatically calculating an actual capacity utilization on an expected date of each node of the plurality of nodes, the actual capacity utilization being based on the retrieved updated current capacity utilization, the capacity of a current day, and the backlog;
   determining a probability of backlog on the expected date of each node of the plurality of nodes, the probability of backlog being based on a lack of capacity given the actual capacity utilization;

generating a network average capacity utilization cost model defining a lower capacity utilization threshold of each node of the plurality of nodes and an upper capacity utilization threshold of each node of the plurality of nodes, the lower capacity utilization threshold being a predetermined capacity utilization variance below the network average capacity utilization, and the upper capacity utilization threshold being based on the determined probability of backlog;

automatically converting a processing cost of the current order, a backlog cost, a labor cost, the network average capacity utilization, and the actual capacity utilization of each node of the plurality of nodes into a capacity utilization cost of the each node using the generated network average capacity utilization cost model; and transmitting the capacity utilization cost of each node to an order fulfillment engine, the order fulfillment engine being a multi-objective optimization-based engine of an order management system, the fulfillment engine having a computer processor and a memory, the memory having program instructions, which, when executed, cause the processor to perform the steps of:

receiving the electronic record of the current order for node order assignment;

retrieving the processing cost data of each node from a plurality of nodes, receiving the converted capacity utilization cost of each node from a plurality of nodes the computer processor of the order fulfillment engine having program instructions, which when executed by the processor of the order fulfillment engine, performs the steps of:

automatically calculating a fulfillment cost of each node of the plurality of nodes of the current order based on the processing cost data of each node from the plurality of nodes and the capacity utilization cost of each node from a plurality of nodes;

identifying one or more nodes from the plurality of nodes of the current order with the lowest fulfillment cost based on the calculated fulfillment cost; and automatically generating a node order assignment assigning the current order to one of the one or more nodes with the lowest fulfillment cost thereby balancing the node fulfillment between the plurality of nodes based on actual capacity.

7. The computer system of claim 6, wherein the capacity utilization cost is the negative of the processing cost, when the calculated actual capacity utilization is lower than the lower capacity utilization threshold.

8. The computer system of claim 6, wherein the capacity utilization cost is calculated by adding the backlog cost and deducting the processing cost, when the calculated actual capacity utilization is higher than the upper capacity utilization threshold.

9. The computer system of claim 6, wherein the capacity utilization cost is based on the network average capacity utilization, the actual capacity utilization, and the labor cost, when the calculated actual capacity utilization equals or is in between the lower capacity utilization threshold and the upper capacity utilization threshold.

10. The computer system of claim 9, wherein converting the capacity utilization cost includes:

Capacity Utilization Cost=$[(CU-Avg\_CU)/Avg\_CU] \times Labor\_Cost$, wherein CU is the actual capacity utilization, Avg_CU is the average capacity utilization, and Labor_Cost is the labor cost.

11. The computer system of claim 6, wherein the capacity of a current day is collected from a planned daily capacity database, the current capacity utilization is collected from a node unit assignment database, the backlog is collected from a backlog database, the backlog cost is collected from a backlog cost database, the labor cost is collected from a labor cost database, the processing cost is collected from a processing cost database, and the network average capacity utilization is collected from a network average capacity utilization database.

12. A non-transitory article of manufacture tangibly embodying computer readable instructions, which when implemented, cause a computer to perform the steps of a method for determining node order fulfillment performance, comprising:

receiving by a computer processor of a network average capacity utilization cost module an electronic record of a current order from a customer, the computer processor of the network average capacity utilization cost module having program instructions, which when executed by the processor of the network average capacity utilization cost module, performs the steps of:

retrieving data of each node from a plurality of nodes, the retrieved data of each node comprising, capacity of a current day, backlog and network average capacity utilization;

determining current capacity utilization for each node, the current capacity utilization being the percentage of total daily capacity used so far in a current day;

continuously updating the current capacity utilization;

automatically calculating an actual capacity utilization on an expected date of each node of the plurality of nodes, the actual capacity utilization being based on the retrieved updated current capacity utilization, the capacity of a current day, and the backlog;

determining a probability of backlog on the expected date of each node of the plurality of nodes, the probability of backlog being based on a lack of capacity given the actual capacity utilization;

generating a network average capacity utilization cost model defining a lower capacity utilization threshold of each node of the plurality of nodes and an upper capacity utilization threshold of each node of the plurality of nodes, the lower capacity utilization threshold being a predetermined capacity utilization variance below the network average capacity utilization, and the upper capacity utilization threshold being based on the determined probability of backlog;

automatically converting a processing cost of the current order, a backlog cost, a labor cost, the network average capacity utilization, and the actual capacity utilization of each node of the plurality of nodes into a capacity utilization cost of the each node using the generated network average capacity utilization cost model; and transmitting the capacity utilization cost of each node to an order fulfillment engine, the order fulfillment engine being a multi-objective optimization-based engine of an order management system;

receiving by a computer processor of the order fulfillment engine the electronic record of the current order for node order assignment;

retrieving by the computer processor of the order fulfillment engine the processing cost data of each node from a plurality of nodes, receiving by the computer processor of the order fulfillment engine the capacity utilization cost of each node from a plurality of nodes, the computer processor of the order fulfillment engine having program instructions, which when executed by the processor of the order fulfillment engine, performs the steps of:

automatically calculating a fulfillment cost of each node of the plurality of nodes of the current order based on the processing cost data of each node from the plurality of nodes and the capacity utilization cost of each node from a plurality of nodes;

identifying one or more nodes from the plurality of nodes of the current order with the lowest fulfillment cost based on the calculated fulfillment cost; and automatically generating a node order assignment assigning the current order to one of the one or more nodes with the lowest fulfillment cost thereby balancing the node fulfillment between the plurality of nodes based on actual capacity.

13. The non-transitory article of manufacture of claim 12, wherein the capacity utilization cost is the negative of the processing cost, when the calculated actual capacity utilization is lower than the lower capacity utilization threshold.

14. The non-transitory article of manufacture of claim 12, wherein the capacity utilization cost is calculated by adding the backlog cost and deducting the processing cost, when the calculated actual capacity utilization is higher than the upper capacity utilization threshold.

15. The non-transitory article of manufacture of claim 12, wherein the capacity utilization cost is based on the network average capacity utilization, the actual capacity utilization, and the labor cost, when the calculated actual capacity utilization equals or is in between the lower capacity utilization threshold and the upper capacity utilization threshold.

16. The non-transitory article of manufacture of claim 15, wherein converting the capacity utilization cost includes:

Capacity Utilization Cost=$[(CU-Avg\_CU)/Avg\_CU] \times Labor\_Cost$, wherein CU is the actual capacity utilization, Avg_CU is the average capacity utilization, and Labor_Cost is the labor cost.

* * * * *